July 21, 1942.  A. METZL  2,290,442
PROCESS FOR THE RECTIFICATION OF IMPURE ALCOHOLIC LIQUIDS
Filed April 7, 1939  2 Sheets-Sheet 1
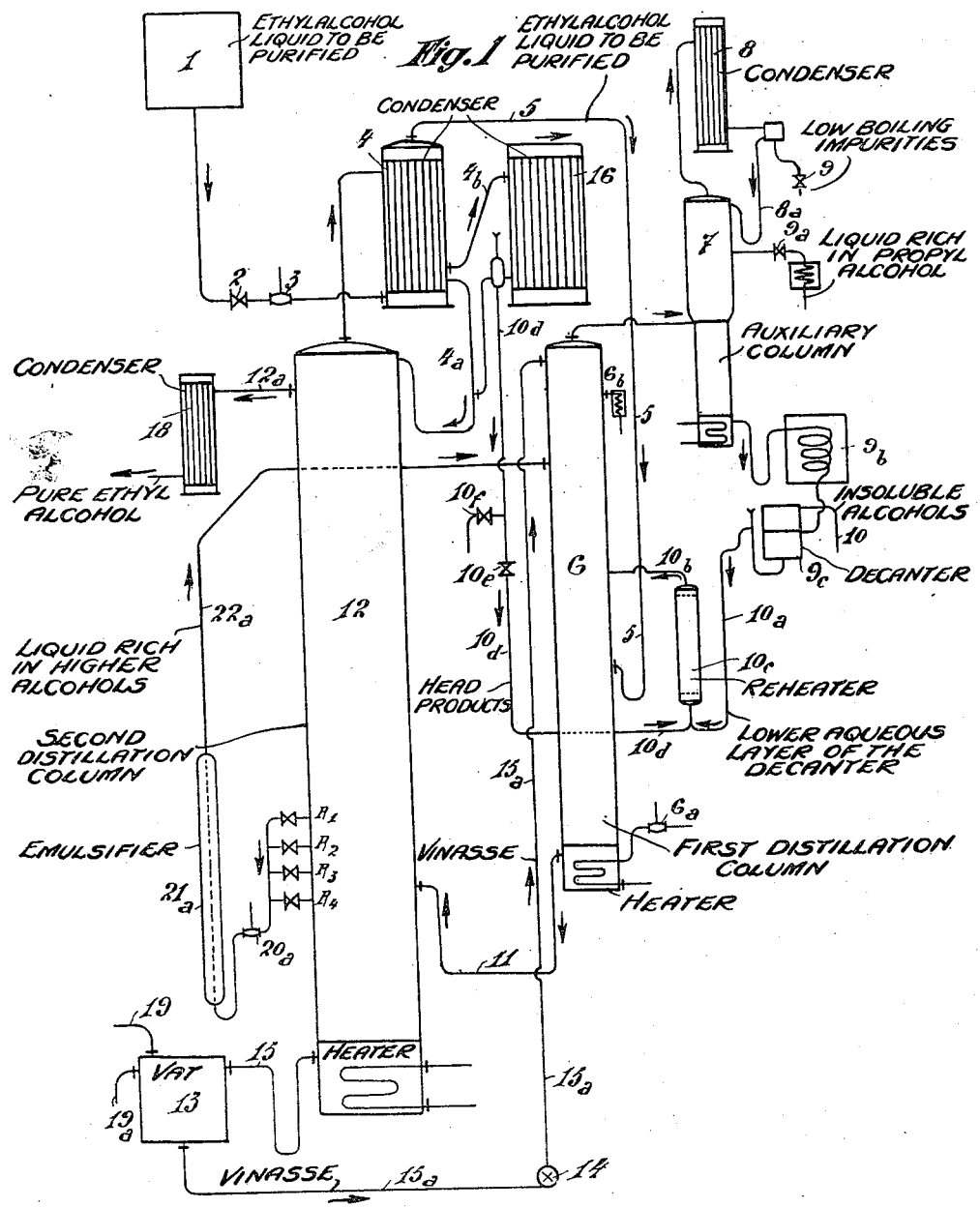

July 21, 1942.  A. METZL  2,290,442
PROCESS FOR THE RECTIFICATION OF IMPURE ALCOHOLIC LIQUIDS
Filed April 7, 1939 2 Sheets-Sheet 2
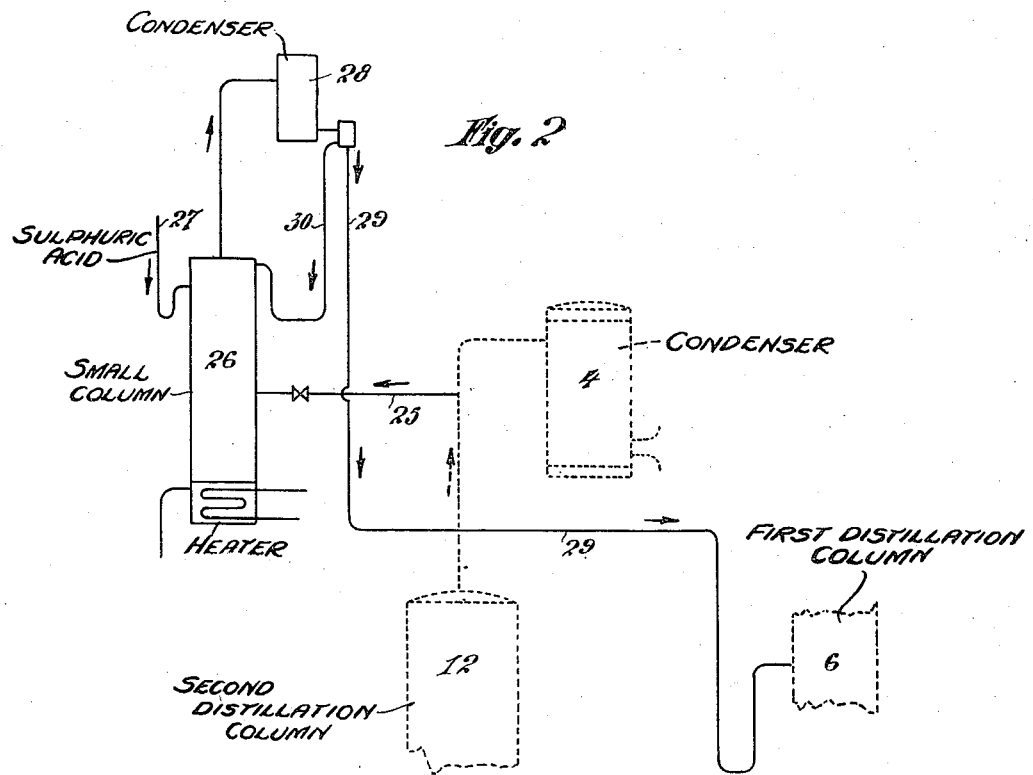

Patented July 21, 1942

2,290,442

UNITED STATES PATENT OFFICE 2,290,442

PROCESS FOR THE RECTIFICATION OF IMPURE ALCOHOLIC LIQUIDS

Albert Metzl, Paris, France, assignor to "Dizem", Societe Anonyme, Geneva, Switzerland, a company of Switzerland Application April 7, 1939, Serial No. 266,697
In Luxemburg July 27, 1938

9 Claims. (Cl. 202—40)

This invention relates to the rectification of impure alcoholic liquids.

Ethyl alcohol produced by fermentation or by synthesis contains various impurities comprising principally other alcohols. These impurities may be, for example, propyl alcohol, isobutyl alcohol, isoamyl alcohol, aldehydes, esters, ketones, acetals, acids, amines and combinations of these substances amongst themselves or with ethyl alcohol.

In the course of the rectification of ethyl alcohol by ordinary processes, a subproduct is obtained designated under the name "bad tasting portion" comprising, besides the above mentioned impurities, a considerable proportion of ethyl alcohol. Rectification by the classic method does not permit separating the ethyl alcohol contained in these bad-tasting portions in a complete and satisfactory manner and in the form of a pure product, owing to the nearness of the boiling point of the different substances contained in this mixture and of which several form azeotropic mixtures between themselves or with ethy alcohol and water. The bad tasting portions are only of very small interest commercially and are used largely in compositions of alcohol used for burning.

It is known that if an aqueous solution poor in ethyl alcohol is distilled with, for example, liquids slightly soluble in water (esters, higher alcohols, such as isobutyl alcohol or isoamyl alcohol etc.) these products are rapidly eliminated owing to their high coefficient of volatility. I owe to Sorel, Barbet, Guinet, Dietrich, and Grassmann amongst others the determination of the coefficients of volatility (hereafter called K) of the various impurities generally accompanying ethyl alcohol. According to the works of the foregoing authors, the coefficient of volatility is higher the lower the standard of ethyl alcohol. It has already been proposed to purify alcoholic must by using the above property, and in 1911 Guillaume suggested adding hot water during the course of the rectification for improving the removal of impurities. Nevertheless the impurities were only partly and insufficiently discarded, owing to the concentration of alcohol at the top of the purification column. It should be pointed out also that it has been proposed to separate an insoluble liquid from a soluble one by the addition of water at the top of the column.

These processes are generally known under the name "processes by hydroselection."

An impurity cannot be separated from ethyl alcohol through hydro-selection unless the impurity has a coefficient of volatility greater than the alcohol.

If the coefficient of volatility K of an impurity is known as a function of the concentration, it is possible to calculate, by means of formulae given in standard publications, the number of plates to be provided in the hydro-selection column as well as the amount of heat to be supplied for separating the impurity.

In the most simple and ideal case, in which the coefficient K remains constant and the weight of vapour on the plates does not vary, it is known that for completely removing an impurity, of which the coefficient of volatility is K, it is necessary to cause the evolution of a weight of vapour at least equal to $$\frac{1}{K-1}$$

kilograms per kilogram of liquid recovered at the base.

On the other hand if it is desired to obtain from the top of the hydro-selection column an impurity free from ethyl alcohol it is necessary to dispense for a given weight of washing water an amount of heat which does not exceed a predetermined value easily calculated.

In other words, the amount of heat to be supplied to the hydro-selection column should be comprised within very restricted limits since if it is excessive the alcohol is not retained in the upper portion of the column and if it is insufficient the impurity is not driven out entirely.

Furthermore it is known that the consumption of heat for concentrating an alcohol depends upon the alcohol content in the phlegms in alcohol and that the heating steam consumption is all the higher the lower the alcoholic standard of the phlegms; consequently if hydro-selection is pushed too far, it yields alcoholic phlegms which are very dilute and difficult to use economically.

It is an object of this invention to provide improved method whereby ethyl alcohol is efficiently and economically separated in the form of a relatively pure product from water insoluble impurities such as isobutyl alcohol, isoamyl alcohol, esters, etc., and from water-soluble impurities such as propyl alcohol, acetaldehyde, etc. which accompany it.

This process, which applies in general to impure hydro-alcoholic liquids: bad tasting portions, must, etc., requires only one hydro-selection column and permits practically complete purification of the ethyl alcohol with less consumption of heating medium.

The method according to the present invention comprises introducing the raw alcoholic aqueous liquid into the intermediate part of a distillation column heated at the base and fed with hot water in its upper part; the impurities escape at the head of this column in the state of vapours and a solution of ethyl alcohol freed from the most impurities but still containing a remainder of higher alcohols and of the other impurities runs down to the base.

This solution is sent to a second distillation column such as a high degree column, in which the ethyl alcohol is concentrated and freed from the rest of the impurities.

I have found besides that in order to facilitate the elimination of the impurities at the top of the first column or hydro-selection column, while making the subsequent concentration of the ethyl alcohol economical, it is suitable to regulate the working conditions of this first column rate of flow of impure liquid introduced, rate of flow of hot spraying water and rate of flow of heating steam in such a way that on the lower plates of this column where the liquid sent to the second column is extracted, this liquid has a total concentration of alcohol between 7 and 15% approximately, and preferably about 10%. It is possible to descend even to approximately 5%.

In addition, this first column will also have a sufficiently large number of plates for the impurities withdrawn from the top thereof to be practically free from ethyl alcohol.

At the base of the second column or concentration column an exhausted vinasse of ethyl alcohol is collected.

I have found that it is particularly advantageous to use with vinasse for spraying the first column; by this means, the available calories as well as the water used for the washing when the plant is set to work are recovered and the small quantities of alcohol which the vinasse may still contain are maintained in the circuit.

If the bad tasting portion treated contains relatively little propyl alcohol and very little or no isoamyl alcohol and isobutyl alcohol it would be possible to extract from the vinasses propyl alcohol, which collects in the concentration column and is found again in the said vinasses, by treating the latter in an auxiliary column before sending them into the hydro-selection column.

If on the contrary the bad testing portions contain a considerable quantity of isoamyl and isobutyl alcohols as well as propyl alcohol, the former will inconvenience the separation of the latter.

I have observed that the higher alcohols collect in the second column near the plates adjacent the feed, and I have found that the best solution for separating these impurities was to draw them off on these plates and to return the liquid, thus removed, to the hydroselection column a few plates above the feed of the bad tasting portions of the said column and into a zone where the liquid contains 0.5 to 1.5% ethyl alcohol, which corresponds, for a given operation, to a well determined plate. Owing to the small content of ethyl alcohol in this zone and in the first plates located below, a practically complete separation of ethyl alcohol is finally obtained, which can be drawn off in a practically pure state towards the top of the second column, and the higher alcohols which escape at the head of the hydroselection column; at the same time the phlegms emerging at the base of the hydroselection column have a sufficiently high content of ethyl alcohol for the concentration and the rectification of these phlegms to be relatively economic.

The impure vapours escaping from the head of the hydroselection column will with advantage be directed towards the centre of a third column, the heating of which is relatively slight, owing to the calories contained in these vapours. This column will make it possible to separate at the head a very volatile impure mixture such as acetaldehyde and ethyl acetate, a few plates below a mixture of impurities rich in propyl alcohol and in impurities of medium volatility such as ordinary acetal and finally at the base a mixture of water and impurities insoluble or very slightly soluble. After cooling the latter mixture may be separated into two layers by decantation; the upper layer containing the insoluble impurities is withdrawn and the lower aqueous layer which may contain traces of dissolved impurities is preferably returned to the hydroselection column.

The description which follows and the attached drawings relate to methods of carrying out the invention given by way of non-limitative example, it being understood that the characteristics which appear both in the drawings and in the text form part of the invention.

Fig. 1 shows schematically an apparatus suitable for putting into practice the process according to the invention.

Fig. 2 illustrates schematically a complementary apparatus which may be added to that of Fig. 1.

Impure alcohol or bad tasting portions (for convenience sake this experssion will be used in all the following description, but it must not be considered limitative) the composition of which is known are stored in the tank 1. By means of the valve 2 and the gauge 3, a known volume of liquid is sent into the heater 4, heated by the vapours which emerge from the high degree column 12.

These warmed up bad tasting portions arrive through the pipe 5 at the side of the column 6 sprayed with vinasse at the head and heated at the base by a worm or by a group of tubes. The column 6 is carefully heat insulated to avoid any useless consumption of heating medium which would further be detrimental in causing concentration of alcohol on the lower plates of this column. For the same reason the liquids should arrive hot, in the column 6, at a temperature adjacent boiling point.

The vapours escaping from the column 6 reach a column 7 provided at its head with a condenser 8 and at the base with a worm or other heating apparatus. A part of the liquid condensed in 8 is returned by 8a to the top of the column 7 and the other part constituted by a mixture of low boiling impurities such as the aldehydes, a portion of the esters and the ketones is withdrawn by the tap 9. A little lower by the tap 9a there is withdrawn a liquid rich in propyl alcohol which may contain some more esters, ketones, and the acetals. The liquid is exhausted of low boiling products on the lower plates of the column 7. At the base of this column a heterogenous liquid comes out, which is cooled in the refrigerator 9b and which runs into the decanter 9c where it separates into two layers. The upper layer rich in higher insoluble alcohols runs off by the overflow 10. The aqueous layer which may contain traces of ethyl alcohol and dissolves impurities is returned to the column 6 by the tubes 10a and 10b after having been reheated to about 90° C. by passage through a steam reheater 10c. This reheater 10c likewise receives through the tube 10d, one head impurities from the column 12 extracted from the condenser 16, the rate of flow which is regulated with the help of the tap 10e.

For a given lot of bad tasting portions and for a constant rate of flow the heating of the column 6 is kept constant.

The regulation of the heating is made easier by means of the indications provided by the rate of flow meter 6a.

With a column 6 having 40 plates it has been found that the optimum consumption of calories was between 3.000 and 4.000 calories for 100 kilos of vinasses containing 10 per cent by volume of ethyl alcohol collected at the base and that for a large number of lots of bad tasting portions treated one of which will be hereinafter described in detail.

Nevertheless the heating may be adapted according to the quality of the bad tasting portions treated, without departing from the scope of the invention.

The exhaustion of alcohol is also followed in the higher part of the column 6 by withdrawing vapours several plates below the top of the column, by condensing them in the refrigerator 6b and by measuring the alcohol content in the aqueous layer of the condensate.

The phlegms, purified but still containing a little of impurities and particularly a remainder of higher alcohols are transferred through pipe 11 into high degree distillation column 12, which is heated by a worm or a group of tubes. Vinasses exhausted of alcohol are discharged from column 12 through an overflow pipe 15 and are stocked in the vat 13 acting as collector. A small balance of cleaning water may be added in this vat, by the tube 19. An overflow for water 19a is likewise provided in the vat 13. By the tube 15a and with the help of a volumetric pump the hot vinasse is returned to the top of the column 6.

The alcoholic vapours coming off at the head of the column 12 passing first into the heater 4 where they heat the bad tasting portions fed from tank 1 to column 6, and the condensed portion thereof is returned by the tube 4a to the top of the column 12; the surplus of the alcoholic vapours passes by the tube 4b, into the refrigerator 16 where these vapours are condensed and cooled. A small quantity of head products are extracted at 10d and are returned for purification in column 6. It is also possible to draw off from time to time by a tap 10f, a portion of these heads particularly if they contain methyl alcohol.

Pure ethyl alcohol is extracted at 12a at a few plates from the top of the column 12 and is cooled in the refrigerator 18.

Propyl alcohol, isobutyl alcohol, isoamyl alcohol as well as some other impurities concentrate in the column 12 and particularly at a few plates above the entry of the pipe 11. By means of the taps R1, R2, R3, R4 the output of which can be regulated, liquid rich in higher alcohols and in ethyl alcohol which is measured by the rate of flow meter 20a is drawn off from these plates. This liquid is taken up by the emulsifier 21a (or any other means adapted to raise the liquid) constituted by one or several tubes inside which the liquid circulates and outside of which live steam acts as a heating medium so as to produce partial boiling of the liquid in the tube, thereby forming a vapour and liquid emulsion which rises in said tube. The mixture of alcohols arrives by the tube 22a near the upper plates of the column 6 in a zone where the content of ethyl alcohol is small and comprised between 0.5 and 1.5%.

Alternatively, it is thus possible to withdraw the impurities in the state of vapour from the column 12 and send these vapours to a zone in the vicinity of the top of the column 6, but it has been found that the regulation with the liquid is more simple.

*Example*

1000 kg. of bad tasting portions containing 4% aldehydes, 5% esters, 5% propyl alcohol, 7% higher alcohols, 20% water and 59% ethyl alcohol, are introduced per hour into the column 6. The heating of the column 6 being 285.000 calories/hour, this represents about 3.400 calories per 100 kg. of phlegms issuing from the base of the column 6, the loss of calories by radiation being taken into consideration.

7.000 kg. per hour of vinasses are delivered by the pump 14 in the upper part of the column 6. Approximately 175 kg. of liquid containing aldehydes, esters, propyl alcohol and about 20% water are extracted from the column 7 by the taps 9 and 9a and 78 kg. higher alcohols containing 10% water are extracted from the decanter 9c by the tap 10. At 18 approximately 620 kg. good taste of rectified alcohol of 96 per cent by volume are extracted and 20 kg. of a mixture of ethyl alcohol and head impurities are returned to the column 6 by the tap 10e.

The column 12 receives by the tube 11, 8.067 kg. of liquid of 8.5% ethyl alcohol and approximately 0.9% higher alcohols with a predominance of propyl alcohol. By means of the gauge 20a there are extracted 300 kg. of liquid with 50% water, 25% ethyl alcohol, approximately 26% higher alcohols which are returned by the tube 22a to the column 6.

Fig. 2 shows an apparatus which may be added to the installation of Fig. 1 in the case of a bad tasting portion rich in amines of low boiling point. (On this figure the parts drawn in dotted line are those already described with reference to Fig. 1 and those drawn in full lines are those of the supplementary apparatus.) A portion of the vapours at the head of the column 12 is taken before entry into the heater 4 and sent by the tube 25 into a small column 26 sprayed by a dilute acid solution entering at 27 (preferably a 5% solution of sulphuric acid). The amines are fixed in the form of non volatile salts and by heating the column 26 at the base, the volatile impurities are eliminated at the top of said column, they are condensed in the refrigerator 28 and they can be directed by the tube 29 towards the column 6. (If necessary one portion of the impurities may be sent back to the column 26 as illustrated at 30 in the figure).

It is obvious besides that the methods of execution described have been given by way of example and that they could be modified without departing from the scope of the invention for this purpose.

In order to diminish the manufacturing costs and to recover in a general manner the available calories in an existing installation producing important quantities of ethyl alcohol it is recommended to attach to this installation the apparatus forming the object of the present invention or only that portion of this apparatus which is not already disposed in the existing plant in order to treat the bad tasting portions extracted from the said plant in a continuous manner.

What I claim is:

1. A method of purifying ethyl alcohol liquids, and especially the bad tasting portions thereof, which comprises, introducing said liquid into a first distillation column, while heating said column at the base and spraying a hot aqueous liquid at the top of said column, whereby the impurities including higher alcohols escape at the head in the form of vapours, collecting at the base of said column the solution purified but still containing a remainder of higher alcohols and of other impurities, feeding said solution thus obtained to a second distillation column, in which the ethyl alcohol is concentrated and separated from the said remainder and withdrawing continuously from said second column the higher alcohols concentrated therein and returning them to a zone of the first column poor in ethyl alcohol.

2. A method of purifying ethyl alcohol liquids and especially the bad tasting portions thereof, which comprises, introducing said liquid into a first distillation column, while heating said column at the base and spraying hot vinasse at the top of said column, whereby the impurities including higher alcohols escape at the head of the column in the form of vapours, collecting at the base of said column the solution purified but still containing a remainder of higher alcohols and other impurities, feeding the solution thus obtained to a second distillation column, in which the ethyl alcohol is concentrated and separated from the said remainder, feeding the vinasse running to the base of said second column to the head of the first column for the spraying operation above mentioned and withdrawing continuously from said second column the higher alcohols concentrated therein and returning them to a zone of the first column poor in ethyl alcohol.

3. A method of purifying ethyl alcohol liquids and especially the bad tasting portions thereof, which comprises, introducing said liquid into a first distillation column, while heating said column at the base and spraying hot vinasse at the head thereof, whereby the impurities including higher alcohols escape at the head of the column in the form of vapours, regulating the heating, rate of flow of ethyl alcohol liquid and vinasse in such manner as to obtain, at the base of the column, a total concentration of alcohol ranging from 5 to 15 per cent, collecting the liquid obtained at the base of the column, feeding said liquid to a second distillation column, in which the ethyl alcohol is concentrated and separated from the remainder of the impurities, including the rest of higher alcohols feeding the vinasse running to the base of said second column to the head of the first column for the spraying operation above mentioned and withdrawing continuously from said second column the rest of higher alcohols concentrated therein and returning them to a zone of the first column poor in ethyl alcohol.

4. A method of purifying ethyl alcohol liquids and especially the bad tasting portions thereof, which comprises, introducing said liquid into a first distillation column, while heating said column at the base and spraying hot vinasse at the head thereof, whereby the impurities escape at the head of the column in the form of vapours, sending said vapours into an auxiliary column, extracting various respective impurities from said auxiliary column at different levels thereof, separating the liquid running to the base of said auxiliary column into two layers, sending back the lower layer to the first mentioned column, feeding the liquid running to the base of said first mentioned column to a second distillation column, in which the ethyl alcohol is concentrated and freed from the remainder of the impurities it contains, feeding the vinasse running to the base of said last mentioned distillation column to the head of the first mentioned column, for the spraying operation above mentioned and withdrawing continuously from said second column the higher alcohols concentrated therein and returning them to a zone of the first column poor in ethyl alcohol.

5. A method of purifying ethyl alcohol liquids and especially the bad tasting portions thereof, which comprises, introducing said liquid into a first distillation column, while heating said column at the base and spraying hot vinasse at the head thereof, whereby the impurities escape at the head of the column in the form of vapours, sending said vapours into an auxiliary column, extracting various impurities from said auxiliary column at different levels thereof, decanting the liquid flowing to the base of said auxiliary column, returning to the first mentioned column the aqueous layer thus decanted, feeding the liquid running to the base of the first mentioned column to a second distillation column, in which the ethyl alcohol is concentrated and freed from the remainder of the impurities it contains, drawing off the impurities from said last mentioned column and returning them into the first column in a zone thereof poor in ethyl alcohol, and feeding the vinasse running to the base of the third mentioned column to the head of the first mentioned column, for the spraying operation to be performed in said first mentioned column.

6. A method of purifying ethyl alcohol liquids, and especially the bad tasting portions thereof, which comprises, introducing said liquid into a first distillation column, while heating the column at the base and spraying hot vinasse at the head thereof, whereby the impurities escape at the head of the column in the form of vapours, sending a portion of said vapours into an auxiliary column, decanting the liquid flowing to the base of said auxiliary column, returning to the first mentioned column the aqueous layer thus decanted, collecting at the base of said first mentioned column the solution purified as to its volatile components but still containing a certain percentage of higher alcohols and other impurities, feeding the solution thus obtained to a second distillation column, in which the ethyl alcohol is concentrated and freed from the remainder of its impurities, sending a portion of the vapours escaping from the last mentioned distillation column into a small column while spraying therein a solution of acid, condensing the volatile impurities escaping at the top of said small column, feeding at least one portion of the said condensed impurities to the first mentioned column, feeding the vinasse which runs to the base of the third mentioned column to the head of the first column, for the spraying operation to be performed therein and withdrawing continuously from said second column the higher alcohols concentrated therein and returning them to a zone of the first column poor in ethyl alcohol.

7. A method of purifying ethyl alcohol liquids, and especially the bad tasting portions thereof, which comprises, introducing said liquid into a first distillation column, while heating said column at the base and spraying a hot aqueous liquid at the top of said column, whereby the impurities including higher alcohols escape at the head in the form of vapours, collecting at the base of said column the solution still containing a remainder of higher alcohols and of other impurities, feeding said solution thus obtained to a second distillation column, in which the ethyl alcohol is concentrated and separated from the said remainder, withdrawing continuously away from said second column, approximately at the level of the supply in said second column of the liquid feed from the first one, a liquid rich in higher alcohols and returning the said liquid into the first mentioned column in a zone thereof poor in ethyl alcohol.

8. A method of purifying ethyl alcohol liquids, and especially the bad tasting portions thereof, which comprises, introducing said liquid into a first distillation column, while heating said column at the base and spraying a hot aqueous liquid at the top of said column, whereby the impurities including higher alcohols escape at the head in the form of vapours, collecting at the base of said column the solution still containing a remainder of higher alcohols and of other impurities, feeding said solution thus obtained to a second distillation column, in which the ethyl alcohol is concentrated and separated from the said remainder, withdrawing continuously away from said second column, above the level of the supply in said second column of the liquid feed from the first one, a liquid rich in higher alcohols and returning the said liquid into the first mentioned column, in a zone thereof where the content of ethyl alcohol is between 0.5% and 1.5%.

9. A method of purifying ethyl alcohol liquids, and especially the bad tasting portions thereof, which comprises, introducing said liquid into a first distillation column, while heating said column at the base and spraying a hot aqueous liquid at the top of said column, whereby the impurities including higher alcohols escape at the head in the form of vapours, collecting at the base of said column the solution still containing a remainder of higher alcohols and of other impurities, feeding said solution thus obtained to a second distillation column, in which the ethyl alcohol is concentrated and separated from the said remainder, withdrawing continuously away from said second column, above the level of the supply in said second column of the liquid feed from the first one, a liquid rich in higher alcohols and returning the said liquid into the first mentioned column, above the supply in the said column of the ethyl alcohol liquid to be purified and in a zone thereof where the content of ethyl alcohol is between 0.5% and 1.5%.

ALBERT METZL.